INVENTOR.
HARUO ITO
BY Q. C. Smith
ATTORNEY 3,473,117
BRIDGE CIRCUIT HAVING PHASE SHIFTER AND
NULLING DIRECTION INDICATOR
Haruo Ito, Loveland, Colo., assignor to Yokogawa-Hewlett-Packard, Ltd., Tokyo, Japan, a corporation of Japan
Filed Nov. 16, 1966, Ser. No. 594,759
Claims priority, application Japan, Dec. 15, 1965, 40/77,188
Int. Cl. G01r 27/00
U.S. Cl. 324—57
2 Claims

ABSTRACT OF THE DISCLOSURE

An AC bridge circuit for measuring the value of an impedance element includes an automatic balancing bridge system which operates at a high sensitivity over a wide measuring range of unknown impedance values. This is accomplished in accordance with the illustrated embodiment of the present invention by using the output signal that occurs at the output of the phase detector of this invention as the adjusting signal for automatically balancing one adjustable element of the bridge circuit. A similar automatic balancing system includes a phase shifter and a readout device for providing an indication of the direction of adjustment of a variable element to establish bridge balance.

---

Other and incidental objects of the present invention will be apparent from a reading of this specification and an inspection of the accompanying drawing in which.

Figure 1:
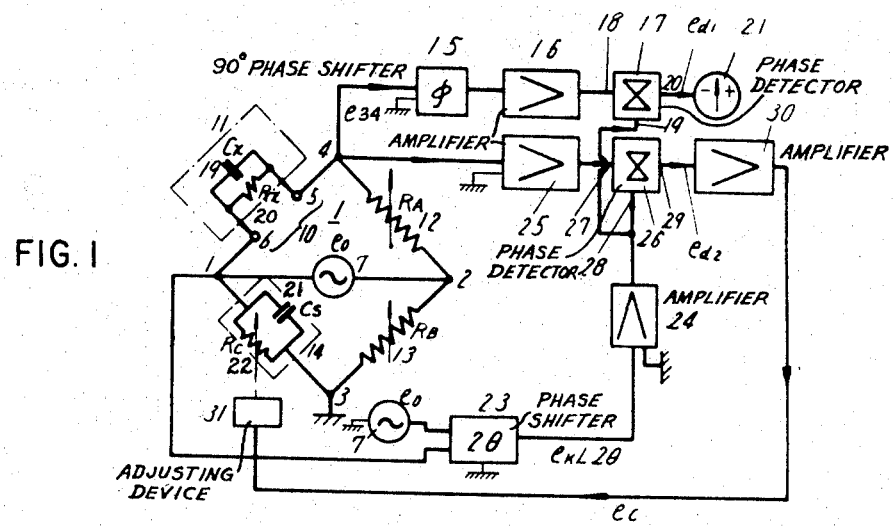
FIGURE 1 is a block diagram showing the circuit according to one embodiment example of this invention.

Referring to FIGURE 1, there is shown a connection diagram of the $2\theta$ method semi-automatic balancing bridge system in which the present invention is applied. Self-balancing bridge circuits of this type are described in U.S. patent application Ser. No. 579,555 filed on Sept. 15, 1966, by G. Yokoyama, T. Muraoka and H. Noguchi. Bridge circuit 1 shown here is a capacity bridge which can measure the capacity and loss resistance of a capacitor element. This circuit includes the unknown arm 10 and first proportional arm variable resistor 12 connected in a first series circuit and a variable impedance circuit 14 including the parallel circuit of variable resistor 22 and fixed capacitor 21 and second proportional arm variable resistor 13 connected in a second series circuit. These two series circuits are connected in parallel between the output terminals 1 and 2 of AC power source 7 which drives this bridge circuit. The detector terminals 3 and 4 are provided at the common connections of elements in the first and second series circuits. Measuring arm 10 is furnished for connecting the element to be measured. It is assumed that capacitor 11 to be measured connected between terminals 5 and 6 has an equivalent parallel circuit of capacitor 19 and loss resistor 20. The detector terminals 3 and 4 are connected to the input of the first phase shifter 15; the output of phase shifter 15 is connected to the input of AC amplifier 16; the output of AC amplifier 16 is connected to one input 18 of the first phase detector 17. The phase shift between the input and output of phase shifter 15 is 90 degrees. Also, the phase shift between the input and output of amplifier 16 is regarded materially as zero. Thus, the unbalanced voltage signal that occurs at the detector terminals 3 and 4 of bridge circuit 1 is phase-shifted by 90 degrees by phase shifter 15, is then boosted by amplifier 16, and is applied to input 18 of first phase detector 17.

One terminal 1 of variable impedance circuit 14 is connected to one input of the second phase shifter 23 which thus receives the signal $e_2 < \theta$ that appears between terminals 1 and 3 of impedance circuit 14. Also, the other input of the second phase shifter 23 receives the output signal $e_0$ of AC power source 7. The signal at the output of the second phase shifter is thus $e_k < 2\theta$ which has a phase angle that is twice the phase angle $\theta$ of voltage signal $e_2$ that occurs between terminals 1 and 3 relative to the phase of output voltage $e_0$ of AC power source 7. This output signal $e_k < 2\theta$ is boosted by AC amplifier 24 and is supplied to the other input terminal 19 as the reference phase signal of first phase detector 17. In this system, first phase shifter 15 is inserted between the bridge circuit detector terminal and one input 18 of first phase detector 17, but it should be understood that phase shifter 15 may also be inserted between the output of AC amplifier 24 and the other input 19 of first phase detector 17.

First detector 17 generates a DC output with inverted polarity when the component phase for the reference phase signal applied to one input 18 is inverted. This DC output signal is applied to polarity discriminator 21 which indicates the polarity of DC signals. In place of phase detector 17, a ring modulator, for instance, may be used. As polarity discriminator 21, a zero-centered movable needle type DC meter, as in the diagram, or a neon lamp circuit convenient for discriminating the polarity of DC, is suitable. By using a dial type variable resistor for manually adjusting element 13 of bridge circuit 1, the turning direction of the dial can be properly determined according to the indication of polarity discriminator 21, and the magnitude of the unbalanced voltage of the bridge circuit can be adjusted to the minimum. The part described above is the adjustment direction determining device for the adjustable element 13 of this system.

The adjustable element 22 may be adjusted automatically as the adjustable element 13 is adjusted manually. The detector terminals 3 and 4 of bridge circuit 1 are connected to the inputs of AC amplifier 25, and the output of amplifier 25 is connected to one input terminal 27 of second phase detector 26. The amplified signal of variable phase signal $e_k < 2\theta$ from amplifier 24 is applied as the reference phase signal to the other input terminal 28 of second phase detector 26. This phase detector 26 produces a DC signal $e_{d2}$ at its output 29 which corresponds to the reference signal component of the signal (i.e. a signal of equal phase to unbalanced signal $e_{34}$ of the bridge circuit) applied to its one input. This DC signal $e_{d2}$ is applied to DC amplifier 30 which amplifies the signal for application adjusting device 31 associated with the variable resistor 22. Adjusting device 31 adjusts the resistance value of variable resistor 22 in either direction according to the polarity of output signal $e_c$. The connection polarity of the output of amplifier 30 and adjusting device 31 is selected in a direction that unbalanced signal $e_{34}$ of bridge circuit adjusts resistor 22 toward its minimum value. For example, by using a slide rheostat in place of variable resistor 22, as this adjusting device 31, a balancing motor may be applied which is normally used in automatic balancing meters, and which turns reversibly in accordance with the polarity of DC signals. Or, in place of variable resistor 22, a resistance element whose resistance varies according to a light signal may be used, and adjusting device 31 provides illumination with an intensity which is proportional to the DC output signal of amplifier 30.

The operation of the system of FIGURE 1 is best described with reference to the relations between the voltages generated between the branches of bridge circuit 1 which branches are reproduced in the simplified diagram of FIGURE 3. The power source terminals 1 and 2 are represented by O and Q, and detector terminals 3 and 4 are represented by P and S. Here, it is assumed that the letter symbols given to elements connected between various branches represent the electric constant values of the respective elements.

Figure 4:
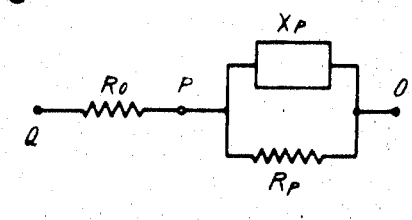
FIGURE 4 is a simplified diagram of the bridge circuit of FIGURE 3.

In order to analyze how the electric potential that occurs at branch P changes when a reference voltage is applied between two ends O and Q of branch O–P–Q, branch circuit O–P–Q is generalized and shown in the equivalent circuit of FIGURE 4. Here, $X_p$ represents the equivalent reactance connected in parallel between OP with the equivalent resistance $R_p$.

The vector voltage $(\overline{OP}/\overline{OQ})$ which occurs between branch OP when a unit voltage is applied between terminals OQ can be expressed by the following complex formula:

$$\left(\frac{OP}{OQ}\right) = \frac{R_P(R_O+R_P)}{(R_O+R_P)^2 + \frac{(R_O R_P)^2}{X_P^2}} + j \frac{\frac{R_O R_P^2}{X_P}}{(R_O+R_P)^2 + \frac{(R_O R_P)^2}{X_P^2}} \quad (1)$$

In Formula 1, the first term of the right side is the in-phase component with the unit voltage applied between OQ of $(\overline{OP}/\overline{OQ})$, and the second term is the quadrature component. Here, assuming that $$x = \frac{R_P(R_O+R_P)}{(R_O+R_P)^2 + \left(\frac{R_O R_P}{X_P}\right)^2} \quad (2)$$

$$Y = \frac{\left(\frac{R_O R_P}{X_P}\right) R_P}{(R_O+R_P)^2 + \left(\frac{R_O R_P}{X_P}\right)^2} \quad (3)$$

the following will be valid:

$$\left(\frac{OP}{OQ}\right) = x + jy$$

Figure 5:
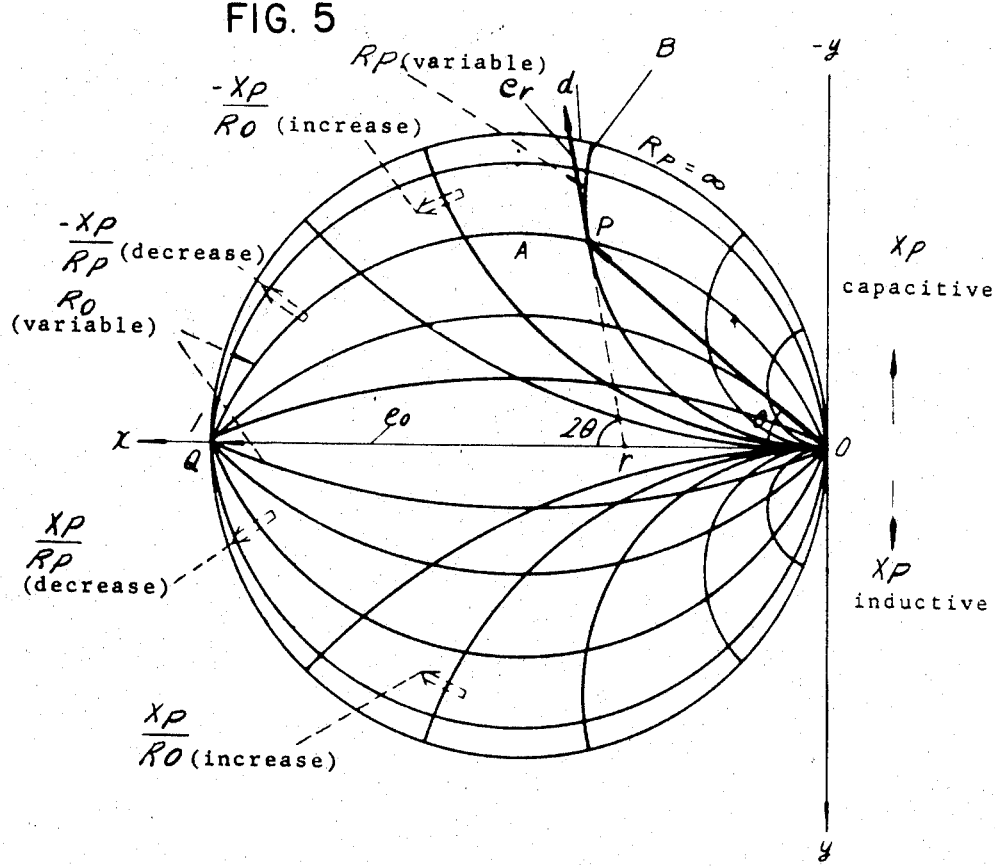
FIGURES 5 and 6 are graphs of the operating characteristics for describing the operation of this invention.

Therefore, in reference to one complex plane FIGURE 5, assuming in this plane that O is the origin $x$ is the real number axis, and $y$ is the imaginary number axis, the reference unit voltage applied between OQ in FIGURE 4 can be expressed by unit length vector $\overline{OI}$ drawn from O over real number axis $x$ in FIGURE 5. Also, the potential of point P in FIGURE 4 is coordinates $(x,y)$ on this plane, and the voltage between OP can be expressed by vector $\overline{OP}$. (Hereinafter, the vector quantity is expressed by drawing horizontal line over letter symbols.) By eliminating $R_P$ from expressions (2) and (3), we get the following:

$$x^2 + \left(y - \frac{X_P}{2R_O}\right)^2 = \left(\frac{X_P}{2R_O}\right)^2 \quad (4)$$

Therefore, from expression (4), it can be seen that the locus of point P at the end of $\overline{OP}$ when $R_P$ is varied draws an arc with coordinates $(O, X_P/2R_O)$ as the center and $X_P/2R_O$ as the radius.

Also, by eliminating $R_O$ from expresions (2) and (3), we get the following expression:

$$(x-\tfrac{1}{2})^2 + \left(y + \frac{X_P}{2R_P}\right)^2 = (\tfrac{1}{2})^2 + \left(\frac{X_P}{2R_P}\right)^2 \quad (5)$$

Therefore, from expression (5), it can be seen that the locus of point P when $R_O$ is varied draws an arc with $$\left(\tfrac{1}{2}, -\frac{X_P}{2R_P}\right)$$

as the center and $\sqrt{1/4 + X_p^2/4R_p^2}$ as the radius.

And, $X_P < O$ (i.e. $X_P$ is a capacitive reactance), coordinate $x$ of P is a positive and $y$ is negative.

Upon consideration of the above-mentioned relations and the locus of point P when $X_P$ is fixed, one of $R_P$ and $R_O$ has a constant value and the other is varied, as shown in the diagram FIGURE 5. From this diagram, when $X_P$ is a capacitive reactance, point P is in the upper semicircle of the circle with a diameter of (O1) on the complex plane, and in case $X_P O$ (i.e. inductive reactance), point P is in the lower semi-circle.

Figure 3:
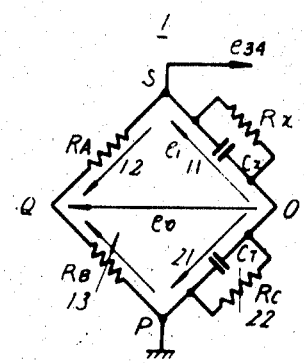
FIGURE 3 is a schematic diagram of a bridge circuit for use in the illustrated embodiments of this invention.

Referring to the capacity bridge circuit of FIGURE 3, assume that the magnitude of driving voltage $e_0$ applied to power source end OQ is unit value, then FIGURE 5 shows the vector diagrams of the potentials appearing at various branch points and the voltage appearing across branch points. The coordinates of point P, when capacity $C_T$ of capacitor 21 on arm O–P–Q in the bridge circuit of FIGURE 3 and $R_B$ and $R_C$ take arbitrary values, can be represented (when, in FIGURE 4, $X_P$ is replaced by $-1/2\pi f C_T$, $R_P$ by $R_C$, and $R_O$ by $R_B$) by the point of intersection P with locus A of $R_O$ which satisfies $R_P = R_C$ in FIGURE 5 and with locus B or $R_P$ which satisfies $R_O = R_B$. And vector $\overline{OP}$ represents the voltage (vector) that appears across variable impedance arm OP, and angle $\theta$ that $\overline{OP}$ makes with $x$ axis represents the phase angle that $\overline{OP}$ makes with power source voltage $\overline{e_0}$. Assuming that the point of intersection of the tangent of locus B that passes point P and $x$ axis called $r$, angle $P_{rx}$ will be $2\theta$. Consequently, vector $e_r$ whose direction coincides with the tangent of locus at point B represents output signal $e_k < 2\theta$ of second phase shifter 23 of the system of FIGURE 1.

Figure 6:
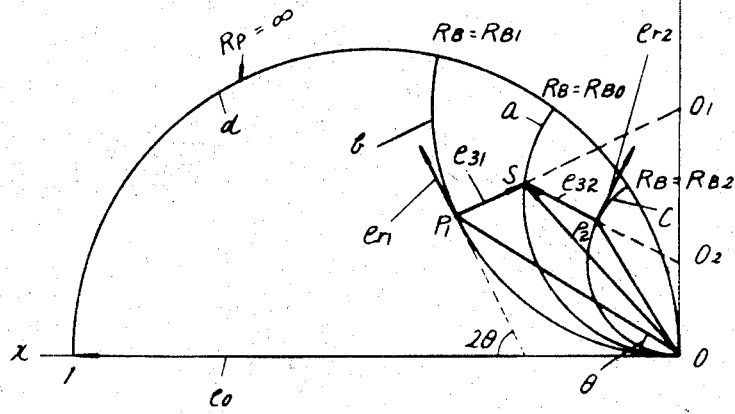

For the purpose of explaining again the mutual relations of the voltages that occur in various arms, a vector diagram of FIGURE 5 is shown in FIGURE 6. Referring to FIGURES 3 and 6, the vector of the driving voltage of standardized magnitude 1 applied to power terminals OQ is shown by reference vector $e_0$ of a unit length. Vector $e_1$ represents the vector of the voltage (when, in branch O–S–Q, constants $R_X$ and $C_X$ of the element under test are assumed as known) that occurs between OS obtained by replacing $R_O$ by $R_A$, $R_P$ by $R_X$, and $X_P$ by $-1/2\pi f C_X$ ($f$ is the power source frequency) in the generalized constants of FIGURE 4. Assuming that the constants of various elements of branch O–S–Q are fixed, the position of point S on the vector plane will be fixed at a constant point. Thus, the bridge system of FIGURE 1 wherein the value of capacitor 21 of the variable impedance arm is fixed in a system in which the resistance $R_C$ of variable resistor 22 is automatically adjusted by means of the $2\theta$ method adjusting device previously described while the resistance $R_B$ of variable resistor 13 is manually adjusted. Now, assuming, in FIGURE 6, that the value of $R_B$ becomes $R_{BO}$ when point P and point S coincide, the potential of point P is located on locus $a$ of FIGURE 6 that passes point S and thus satisfies the condition $R_B = R_{BO}$ regardless of the value of resistance $R_C$ of the variable impedance arm. Also, in case the set value of $R_B$ and $R_{B1}$ and this value is smaller than $R_{BO}$, the potential of point P is located outside the locus circle $a$ on locus arc $b$ (a locus that satisfies $R_B = R_{B1}$) which passes within the plane surrounded by said circle and locus circle $d$ (a locus that satisfies the condition of $R_P = \infty$). In case $R_B$ is set at a value of $R_{B2}$ larger than $R_{BO}$, the potential of point P is located within the circle of locus circle $a$ on locus circle $c$ (a locus that satisfies $R_B = R_{B2}$) that passes within the plane enclosed by said circle and locus circle $d$. Now, assuming that $R_B$ is set at $R_{B1}$ which is smaller than said $R_{BO}$, and that resistance value $R_C$ of variable resistor 22 is automatically adjusted by the $2\theta$ method automatic adjusting device in a way that unbalanced voltage $e_3$ becomes the smallest, the potential of point P is represented by point of intersection $P_1$ of the straight line (that passes center $O_1$, of locus circle $b$ and point S) and locus circle $b$. An unbalanced voltage $e_3$ at this time is vector $e_{31}$ that goes from this point to point S. Also at this time, the direction of voltage $e_k < 2\theta$ given as reference phase signal to the first and the second phase detectors in FIGURE 1 is represented by vector $e_{r1}$ shifted by 90 degrees in counterclockwise direction from $e_{31}$ at $P_1$.

Also, when $R_B$ is set at $R_{B2}$ which is greater than $R_{BO}$, the potential of point P (at the time $R_C$ is automatically adjusted and unbalanced voltage $e_3$ is at the minimum), is represented by point of intersection $P_2$ of the straight line (that passes center $O_2$ of locus circle C and point S) and circle C. The unbalanced voltage $e_3$ is represented by vector $e_{32}$ which goes from this point to point S; and the direction of reference phase voltage of the phase detector at this time can be given by vector $e_{r2}$ shifted 90 degrees in clockwise direction from $e_{32}$ at point $P_2$. The phase relations between reference phase voltage $e_k < 2\theta$ and unbalanced voltage $e_3$ in these two cases are (1) when $R_B$ is $R_{B1}$ which is smaller than the value $R_{BO}$ of balancing condition, reference phase voltage $e_k < 2\theta$ is 90 degrees ahead of unbalanced voltage $e_{31}$, and (2) when $R_B$ is $R_{B2}$ which is greater than $R_{BO}$, $e_k < 2\theta$ is 90 degrees behind unbalanced voltage $e_{32}$. Thus, in the circuit of FIGURE 1, the signal applied to input 18 of first phase detector 17 is a voltage with a 90 degree shift from unbalanced voltage $e_{32}$. Assuming, for example, that this is a voltage 90 degrees ahead of $e_{32}$, this voltage in (1) is in-phase with reference phase voltage $e_{r1}$, and in (2) is anti-phase to $e_{r2}$. Consequently, synchronous rectification by the phase detector produces at output 20 a positive rectified output in (1) and a negative rectified output in (2). This output is supplied to polarity discriminator 21 which thus provides the indication when the rectified output is positive, $R_B$ should be increased and when the rectified output is negative, $R_B$ should be decreased. Of course, $R_C$ is automatically adjusted as $R_B$ is manually adjusted, and as the balance point is approached the rectified output becomes smaller, and this output becomes zero when point S and point P coincide. The above-mentioned operation applies over the wide range of impedances regardless of the phase angle and magnitude of the variable impedance element and the element to be measured.

Figure 2:
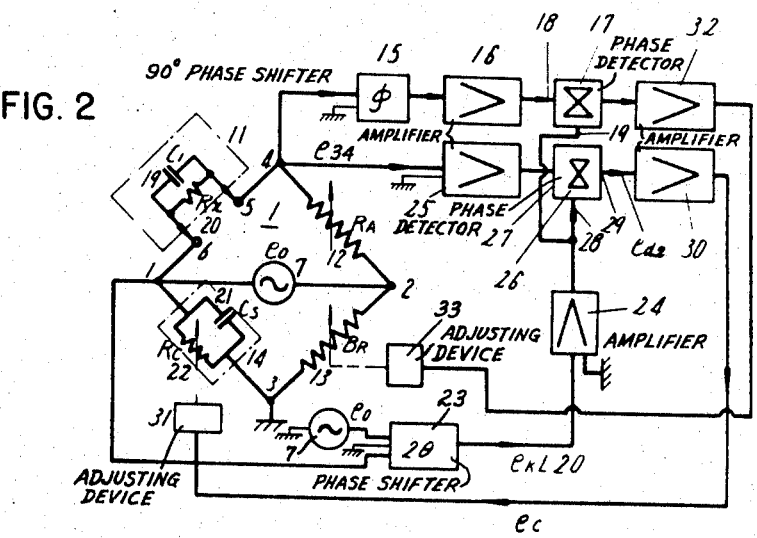
FIGURE 2 is a block diagram of another embodiment of this invention.

FIGURE 2 shows the fully automatic balance bridge system which embodies this invention. In FIGURE 2, those elements that correspond to the component elements of FIGURE 1 are given identical symbols and the descriptions of those parts are omitted here. This system includes an amplifier 32 which amplifies the signal at the output of first phase detector 17 and applies the amplified DC signal to adjusting device 33 for adjusting variable resistor 13 either in a resistance-increase or resistance-decrease direction in accordance with the polarity of said DC signal. This circuit improvement coupled with automatic adjustment of value $R_C$ of variable resistance 22, automatically balances bridge circuit 1. Hunting may be prevented for smooth automatic balancing by designing the adjusting speed of $R_C$ sufficiently great in relation to the adjusting speed of $R_B$.

I claim:
1. An impedance-measuring circuit comprising:
    a plurality of circuit elements including at least two variable elements connected to form a bridge circuit having pairs of diagonally opposed terminals;
    a signal source connected between one pair of diagonally opposed terminals;
    a phase detector having first and second inputs and an output for producing a signal at said output having a polarity indicative of the phase relationship between a selected component of a signal applied to one of the inputs and a reference phase signal applied to another of the inputs;
    a first phase shifter for shifting the phase of a signal applied thereto by substantially 90 degrees;
    a second phase shifter having one input connected to receive the signal from said source and having another input connected to receive the signal appearing across an arm of the bridge circuit in which one of the variable circuit elements is connected, said second phase shifter producing an output signal having a phase angle with respect to signal from said source which is twice the phase angle of signal appearing across said arm with respect to the signal from said source;
    means including the first phase shifter connecting the first input of said phase detector to receive the signal appearing across the other pair of diagonally opposed bridge terminals;
    means connecting the second input of the phase detector to receive the signal on the output of the second phase shifter; and
    circuit means connected to the output of said phase detector for providing an output indicative of the polarity of the signal appearing at said output of said phase detetcor.
2. An impedance measuring circuit as in claim 1 wherein:
    said circuit means includes a control elemnt operatively coupled to the other of said variable circuit elements for altering the impedance of said other variable circuit element in response to the signal at the output of said phase detector.

References Cited

UNITED STATES PATENTS
2,968,180    1/1961    Schafer _____ 324—57 XR

FOREIGN PATENTS
121,862    6//1957    U.S.S.R.

EDWARD E. KUBASIEWICZ, Primary Examiner